1

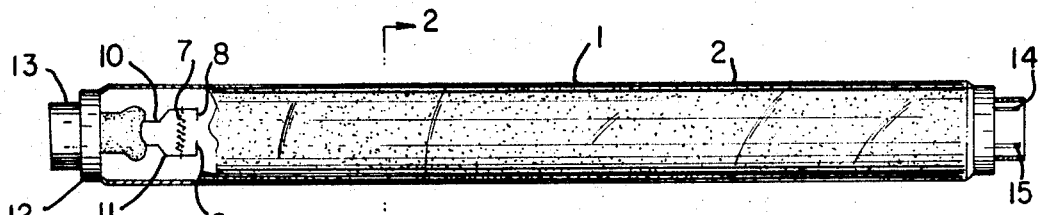
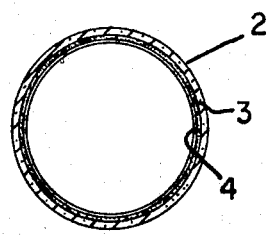
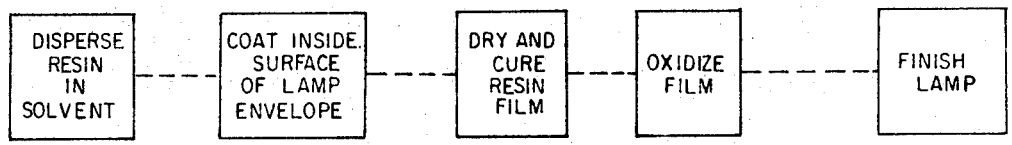
FIG. 3
INVENTORS
ANDRE C. BOUCHARD
PETER W. GAUDET
MARTHA J. B. THOMAS United States Patent Office 3,544,828
Patented Dec. 1, 1970

3,544,828
ELECTRIC DISCHARGE LAMP HAVING A CONTINUOUS THREE-DIMENSIONAL COATING ON THE INNER SURFACE OF THE ENVELOPE
André C. Bouchard, Peabody, Peter W. Gaudet, Lynn, and Martha J. B. Thomas, Winchester, Mass., assignors to Sylvania Electric Products, Inc., a corporation of Delaware
Filed Sept. 25, 1967, Ser. No. 670,268
Int. Cl. H01j 1/62, 63/04
U.S. Cl. 313—109                    7 Claims

ABSTRACT OF THE DISCLOSURE

An electric discharge lamp having a thin, continuous, three-dimensional, amorphous film of crosslinked silicon and oxygen atoms on the inner surface of the glass envelope which inhibits the formation of a dark mercury-alkali amalgam deposit and thereby improves the light maintenance during the life of the lamp. A thin coating of a polyorganosiloxane resin is deposited on the glass, dried, cured and then oxidized at an elevated temperature to form the continuous film. Controlled oxidation eliminates the organic constituents without rupturing the —Si—O—Si— linkages.

BACKGROUND OF THE INVENTION

Field of the invention

This invention relates to electric discharge lamps which have an alkali-containing soft glass envelope, electrodes and mercury in the lamp fill and which can also have a phosphor coating on the envelope.

Description of the prior art

Electric discharge devices such as fluorescent or ultraviolet lamps, commonly undergo an undesirable diminution in their useful light output during life. When this decrease is expressed as the percentage ratio of the amount of light emitted after a certain period of operation to the amount emitted by the lamp when new, it is called lumen maintenance. Typical values for the maintenance of fluorescent lamps after several hundreds or thousands of operating hours are 70% to 90%.

It has been determined that one of the causes of maintenance reduction is the formation of a dark mercury-alkali amalgam deposit on the inside of the glass envelope, the light transmission of which is thereby reduced. During operation, the mercury in the fill reacts with the alkali, especially sodium from the glass, to form the dark amalgam deposit.

U.S. Pat. 3,205,394, issued Sept. 7, 1965 to Ray et al., discloses an aperture fluorescent lamp which had a particulate layer of silica on the inner envelope surface in order to inhibit the previously-mentioned mercury-alkali amalgam formation and improve the lamp maintenance. Since this silica layer was discontinuous, having been deposited from a suspension of finely powdered silica in lacquer, alkali ions could still diffuse through the layer and react with the mercury vapor to form the dark amalgam, although the maintenance was far better than that of an uncoated lamp.

An alternative method of inhibiting the migration of alkali ions was disclosed in U.S. Pat. 3,094,641, issued June 18, 1963 to Gungle et al. The patent described a fluorescent lamp which had a soda-lime glass envelope, the composition of which included a small quantity of antimony trioxide. The antimony inhibited the diffusion of alkali ions to the surface of the glass and thereby re-

2 duced the amount of mercury-alkali amalgam formation and improved the lamp maintenance.

It is an object of this invention to attain even greater improvements in lamp maintenance by inhibiting to a greater degree the formation of the light-reducing mercury-alkali deposit.

SUMMARY OF THE INVENTION

In our invention, an electric discharge lamp has a continuous film or three-dimensional, crosslinked —Si—O—Si— groups firmly bonded to the inside surface of a glass envelope. Expressed another way, the film is a three-dimensional, crosslinked network of silicon and oxygen atoms in the ratio of approximately two oxygen atoms per silicon atom. The continuity of the film renders it more impervious to the diffusion of alkali ions than does the particulate coating of the prior art lamps and thereby reduces the amount of amalgam formation and improves the maintenance of the lamp. The preferred film thickness is less than about one micron.

In order to form the continuous film, a crosslinking polyorganosiloxane resin is dissolved in a solvent and the solution is applied to the inside of the glass envelope to form a thin coating or film. The film is then dried and cured at an elevated temperature to polymerize the resin. The polymerized resin is then carefully oxidized at a temperature of about 250° to 550° C., but preferably at about 500° C., for severals hours to eliminate the organic radicals without rupturing the three-dimensional —Si—O—Si— linkages. During oxidation, additional crosslinking occurs through the substitution of linking —O— atoms for the organic radicals.

Three-dimensional polyorganosiloxanes having the basic structure

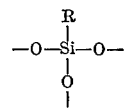

where R is an organic group having 6 or less carbon atoms, preferably methyl, are included in the group of resins that generally can form satisfactory films for the purpose of this invention. Additionally in the preferred resins, the ratio of R groups to Si atoms is between about 0.5 and 1.8 and the ratio of 0 atoms to Si atoms is about 1.5.

BRIEF DESCRIPTION OF THE DRAWING

FIG. 1 is an elevational view, partly in section, of a fluorescent lamp according to this invention.

FIG. 2 is an enlarged cross-sectional view taken on line 2—2 of FIG. 1.

FIG. 3 is a flow sheet of the process of the invention.

DESCRIPTION OF THE PREFERRED EMBODIMENT

In FIG. 1, electric discharge lamp 1 has a sealed, hollow, glass envelope 2 containing a filling of argon, although other suitable gas fillings may be used. In addition, a charge of mercury is introduced into envelope 2, prior to sealing, to yield the necessary mercury vapor for the operation of the lamp. On the inside surface of envelope 2, there is a continuous film 3 of crosslinked —Si—O—Si— groups and a coating 4 of phosphor, as shown in enlarged section in FIG. 2.

At each end of envelope 1 there is an electrode comprising an oxide-coated tungsten coil 7, two auxiliary anodes 8, 9 and support and lead-in wires 10, 11 as shown, for example, in U.S. Pat 2,961,366, issued Nov. 22, 1960 to Waymouth et al. The usual insulating plastic base 12, with boss 13 carrying contacts 14, 15 can be shown in U.S. Pat. 2,896,187, issued July 12, 1959 to Thomas et al.

Glass envelope 2 is usually made of a soda-lime glass having a sodium oxide ($Na_2O$) content greater than about 5%. A typical composition, expressed as the oxide, is noted in Table I.

TABLE I

| | Weight percent |
|---|---|
| $SiO_2$ | 74–76 |
| $Na_2O$ | 14–16 |
| CaO | 5–7 |
| MgO | 3–5 |

During normal lamp processing, glass envelope 2 is baked at a temperature of about 550° C. to remove the binder from the phosphor. In addition, during evacuation, the envelope is reheated to approximately 300° C. to facilitate outgassing of the internal parts of the lamp. Each of these bakeouts tends to diffuse the alkali from the glass of envelope 2 to the surface. During normal lamp operation, mercury ions can combine with the surface alkali to form the dark amalgam deposit on the glass which reduces the light transmission. Phosphor layer 4 is not a continuous film and, alone, is an inadequate barrier to the metallic ions to prevent the amalgam formation. The prior art particulate silica coating, mentioned in U.S. Pat. 3,205,394, supra, reduced the rate of formation and thereby improved the maintenance of the lamp. However, the unique continuity of film 3 is an even greater barrier to the passage of metallic ions and improves the lamp maintenance to a greater extent.

In the first step of the process, as illustrated in FIG. 3, a suitable silicone resin is dissolved in a solvent such as butanol or acetone. In order that the resultant film be three-dimensional and continuous, the resin used must be a crosslinking polyorganosiloxane having the basic structure.

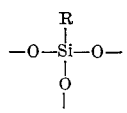

where R is an organic functional group, such as phenyl or ethyl but preferably methyl. A white powdered polymethylethoxysiloxane resin in which the silicon and oxygen constituted about 89% of the total resin weight and in which the ratio of R groups to silicon atoms was about 1.5 proved satisfactory.

In a specific example of the process, a solution of 1% by weight of the white powdered resin in butanol was applied to the inner surface of envelope 2 by flushing, a technique common to the industry. After drying, to eliminate the solvent, the adhering resin film was cured at 200° C. for two hours to polymerize the resin to a higher molecular weight. Envelope 2 with adherent film 3 thereon was then oxidized in air at 500° C. for 72 hours to eliminate the organic groups from film 3. The lamp was then completed by attaching the ends, exhausting and sealing, as is conventional in the art.

The purpose of the oxidation at an elevated temperature is to eliminate the organic constituents without rupturing the three-dimensional —Si—O—Si— network. Although the exact mechanism of the reaction is not known, it is postulated that the carbon and hydrogen of the organic radicals are oxidized to CO or $CO_2$ and $H_2O$, respectively, and a —O— atom is substituted for the organic radical, which results in additional crosslinking. We have found that accurate control of the time and temperature of oxidation is required in order to obtain the desired continuous film and still eliminate substantially all the organic constituents. Baking in air at 500° C. for 72 hours was sufficient in the example described.

Below about 250° C., the reaction is too slow to be practical, greatly exceeding about 7 days. The upper temperature limit is usually governed by the softening point of the substrate, which is about 550° C. for soda-lime glass envelope 2.

The composition of the organic groups in the polyorganosiloxane resin also affects their rate of removal during baking. When R in the above resin formula is predominantly phenyl, longer times and higher temperatures are necessary to eliminate substantially all the organic constituents. Conversely, when R is predominantly ethyl, substantially complete elimination is more easily attained than when R is predominantly methyl. However, the film resulting from polyethylsiloxane resin is more susceptible to crazing or cracking than that from polymethylsiloxane. Therefore, the latter is preferred. The ratio of organic groups to silicon atoms in the resins capable of forming continuous films according to this invention can vary from about 0.5 to 1.8.

Substantially complete elimination of the organic groups is determined by infrared spectrum analysis or thermal gravimetric analysis. In the former, the infrared transmittance curve of the desired film is similar to that of vitreous silica or quartz. In the latter, oxidation degradation at even higher temperatures yields no perceptible weight loss.

It has been determined that linear polyorganosiloxanes, having the structure

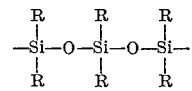

will not yield the desired continuous film when they are cured and oxidized according to this process, since there will be substantially no three-dimensional crosslinking. The residue is merely a coating of finely powdered anhydrous silica. Organic silicates, also, yield a similar discontinuous film.

The combination of the mercury with the alkali which forms the light reducing deposit, mentioned previously, appears to occur within the region extending from the surface of the glass throughout the thickness of the phosphor coating. The normal baking cycles of lamp processing cause the alkali ions within the glass to diffuse toward the inner surface of the envelope, thereby making the inner surface alkali-rich. The discontinuities in the phosphor coating, in addition to those in the particulate silica coating of the prior art, permit a rapid diffusion of both mercury and alkali ions, since the diffusion is essentially in the voids between the particles and hence has a rate approaching that of gaseous diffusion. Thus the combination of the alkali with the mercury ions can occur anywhere within the above-mentioned region with the result that a black-brown mercury-alkali amalgam can be deposited anywhere within this region, that is, on the surface of the glass and/or on the particles of phosphor. In any case, the dark deposit reduces the light transmission. In addition, the dark deposit on the phosphor particles can decrease the amount of 2537 A. radiation reaching the phosphor and thereby reduce the amount of visible light emitted by the phosphor.

In our invention, the continuous three-dimensional film is a greater barrier to the diffusion of alkali ions than is the particulate coating of the prior art. The diffusion of the ions through our film is essentially solid state diffusion and proceeds at a much slower rate than the essentially gaseous diffusion through the particulate coating. Thus, when the greatest amount of alkali diffusion occurs, which is at the elevated temperatures of the usual lamp processes, previously mentioned, fewer alkali ions will have diffused to the inner surface of the glass envelope of our invention.

One test to determine the effectiveness of the barrier layer is to measure the amount of water soluble sodium which has diffused to the inner surface of the glass after the usual baking steps. Normally the unbaked envelope when rinsed with water, yields no measurable amount of water soluble sodium. However, the same rinsing technique on a baked envelope results in measurable amounts of sodium. Table II shows the results on a glass envelope coated with the continuous film of the instant invention and on an uncoated envelope, after both were baked at 550° C. for one hour.

TABLE II

| | Micrograms Na |
|---|---|
| Uncoated | 95 |
| Coated | 21 |

Obviously, the uncoated glass has released 4½ times as much sodium for amalgam formation as has the coated glass.

In order to show that a continuous film is required and that there is an optimum film thickness for a particular lamp, a series of tests on baked 48 inch glass envelopes were run, with the results shown in Table III, following:

TABLE III

| | Film thickness, $\mu$ | Soluble Na, $\mu$g. |
|---|---|---|
| Control envelope (no coating) | | 154 |
| 3% by weight of resin in coating solution | 0.39 | 46 |
| 1% by weight of resin in coating solution | 0.27 | 39 |
| 0.1% by weight of resin in coating solution | 0.11 | 60 |

The above shows that the desired film thickness, for the particular envelope tested, appears to be about 0.10 to 0.40 micron with the optimum at about 0.30 micron. A thinner film has a decreased effect in reducing the rate of diffusion of alkali ions. In the case of thicknesses greater than about 1 micron, crazing of the film results in cracks or discontinuities and permits increased diffusion of the sodium therethrough.

The improvement in light maintenance of clear 40T12 discharge lamps (without a phosphor) which utilized the glass envelope of U.S. Pat. 3,094,641 supra, and half of which were coated according to this invention while the other half were uncoated is shown in Table IV, following:

TABLE IV

| | Percent maintenance | | |
|---|---|---|---|
| | 0 hours | 100 hours | 500 hours |
| Uncoated | 100 | 89.2 | 77.9 |
| Coated | 100 | 96.0 | 91.7 |

Although this invention has been described particularly in relation to fluorescent lamps, it can also be used in other discharge devices having alkali in the glass envelope and mercury in the fill. An example is an ultraviolet lamp which does not have a phosphor. A mercury-alkali amalgam can deposit on the inside surface of the envelope and reduce the transmission of ultraviolet radiation during the life of the lamp. The continuous film of our invention would also increase the maintenance of the ultraviolet lamp.

It is apparent that modifications and changes can be made within the spirit and scope of the instant invention, but is our intention to be limited only by the appended claims.

What we claim is:

1. An electric discharge device comprising: a glass envelope containing electrodes and mercury vapor, the glass of said envelope containing metals which form an amalgam with said mercury, and a continuous three-dimensional film consisting essentially of crosslinked silicon and oxygen atoms disposed upon the inner surface of said envelope for inhibiting a mercury-alkali amalgam formation on the surface of the glass.

2. The discharge device of claim 1 wherein the film thickness is less than 1 micron.

3. The lamp of claim 1 wherein a phosphor is disposed upon said film means.

4. In the manufacture of a discharge device having a fill including mercury and having an alkali-containing glass envelope, the steps which comprise: dissolving a crosslinking polyorganosiloxane resin in a solvent; applying the resin solution to the inner surface of said glass envelope and forming a resinous film thereon; drying and curing said film; and heating said film at a temperature sufficient to oxidize and substantially eliminate therefrom the organic groups in said resin.

5. The process of claim 4 including the step of dissolving in a solvent a crosslinking polyorganosiloxane resin having an organic-group-to-silicon-atom ratio of between 0.5 and 1.8.

6. The process of claim 5 including the step of dissolving in a solvent a polyorganosiloxane resin having predominately methyl organic groups.

7. The process of claim 4 including the step of heating said film at a temperature between about 250° C. and 550° C.

References Cited

UNITED STATES PATENTS

| 2,295,626 | 9/1942 | Beese | 313—221X |
| 2,838,707 | 6/1958 | Schwing et al. | 313—109 |
| 3,018,187 | 1/1962 | Boyce et al. | 313—109X |
| 3,377,494 | 4/1968 | Repsher | 313—109 |
| 2,719,098 | 9/1955 | Goldman | 117—124 |
| 3,015,646 | 1/1962 | Speier | 117—124X |
| 3,205,394 | 9/1965 | Ray | 313—109 |
| 3,296,196 | 1/1967 | Lamoreaux | 117—124X |
| 3,418,153 | 12/1968 | Levene | 117—124X |
| 3,457,323 | 7/1969 | Stengle | 117—124X |

FOREIGN PATENTS

| 122,736 | 5/1944 | Australia | 260—46.5 |

JOHN KOMINSKI, Primary Examiner

DAVID O'REILLY, Assistant Examiner

U.S. Cl. X.R.

117—124; 313—112, 220